United States Patent [19]
Alioto

[11] Patent Number: 5,795,163
[45] Date of Patent: Aug. 18, 1998

[54] EDUCATIONAL DEVICE TO TEACH THE SEVERELY MENTALLY HANDICAPPED

[76] Inventor: Frank J. Alioto, P.O. Box 92243, Lakeland, Fla. 33804

[21] Appl. No.: 960,091

[22] Filed: Oct. 24, 1997

Related U.S. Application Data

[63] Continuation of Ser. No. 657,283, Jun. 4, 1996.

[51] Int. Cl.$^6$ .............................. G09B 1/36; G09B 1/16; A63H 33/06
[52] U.S. Cl. .................... 434/171; 434/167; 434/172; 434/178; 446/118
[58] Field of Search ...................... 446/85, 118, 108; 434/159, 167, 171, 172, 178, 176, 208

[56] References Cited

U.S. PATENT DOCUMENTS

| | | | |
|---|---|---|---|
| 251,763 | 1/1882 | Carpenter | 446/108 |
| 1,327,775 | 1/1920 | Platt | 434/172 |
| 1,682,686 | 8/1928 | Rutherford | 434/172 |
| 3,391,476 | 7/1968 | Sher | 434/171 |
| 3,728,800 | 4/1973 | Magram | 434/171 |
| 4,334,868 | 6/1982 | Levinrad | 434/172 |
| 4,534,736 | 8/1985 | Cogdill | 434/174 |
| 4,690,410 | 9/1987 | Berton | 434/171 |
| 5,013,245 | 5/1991 | Benedict | 434/171 |
| 5,203,706 | 4/1993 | Zamir | 434/172 |
| 5,554,062 | 9/1996 | Goldsen | 434/172 |
| 5,567,159 | 10/1996 | Tehan | 434/167 |

OTHER PUBLICATIONS

Foreign patent document No. 11,304 filed May 1894.

*Primary Examiner*—Robert A. Hafer
*Assistant Examiner*—Laura Fossum

[57] ABSTRACT

A special education device to teach the severely mentally retarded the basic skills of reading comprising four elements; a plurality of blocks, joining mechanisms, a base and a connecting member. Each of the blocks have three special structural characteristics; a symbol or pictorial representation; a means of joining other blocks to form words and sentences only in a horizontal left to right direction; and a means of connecting to the connecting member. All four elements are capable of being united by a student that has severe handicaps in finger dexterity and arm movement. At least the following structures can be formed; sorting in vertical columns; associating the word or sentence formed with a pictorial representation of this word or sentence; words and sentences formed in rows which are parallel to each other and to the flat top surface of the base; formation of words by changing the beginning and ending consonants of a root phonogram.

1 Claim, 5 Drawing Sheets

FIG. 6
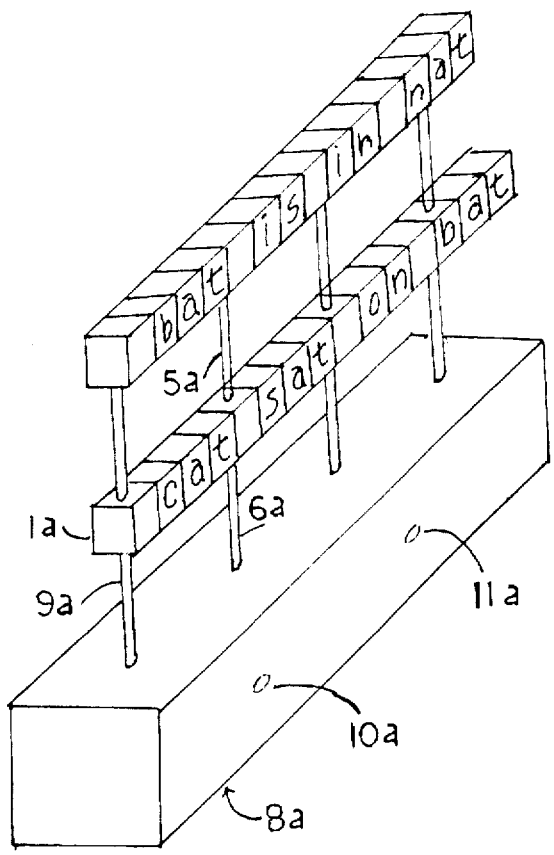
FIG. 6A
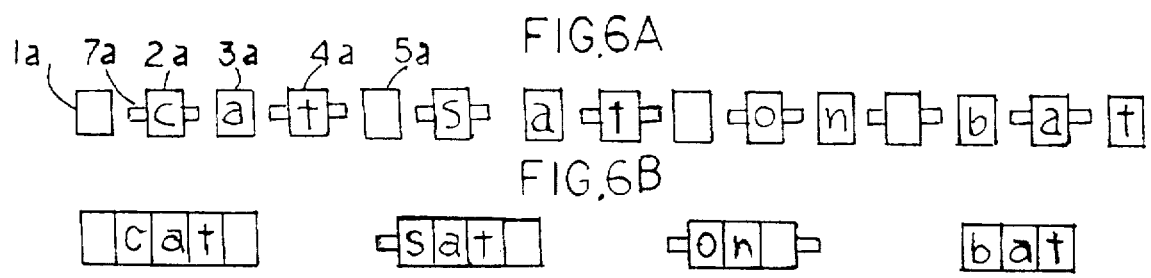
FIG. 6B
FIG. 6C
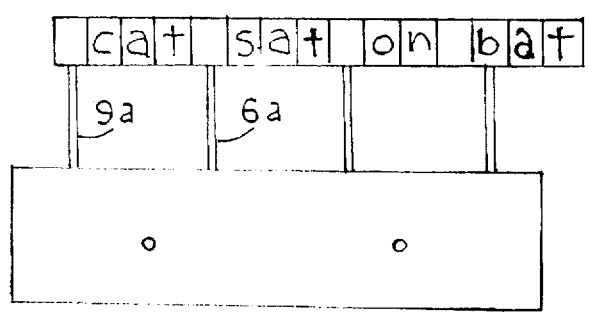

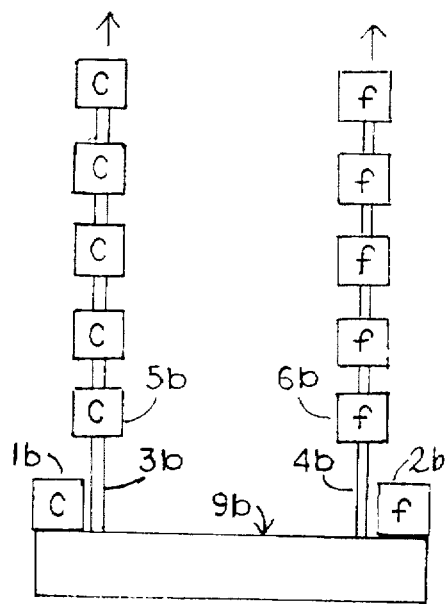
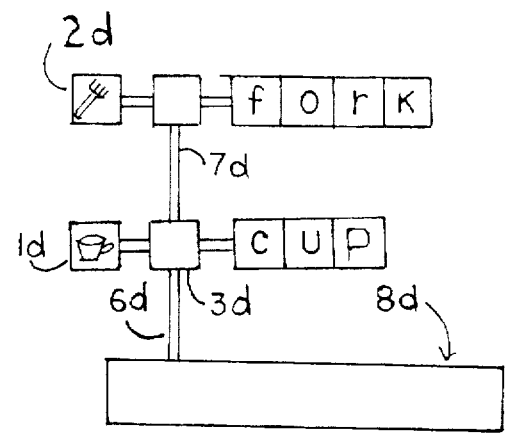
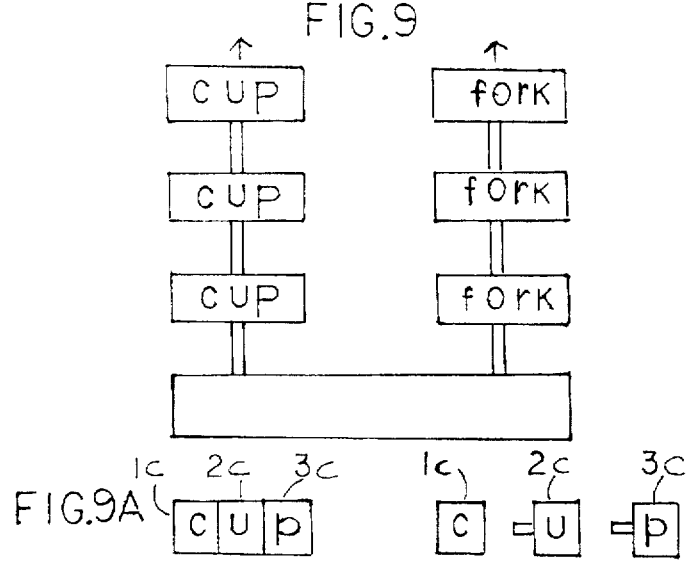
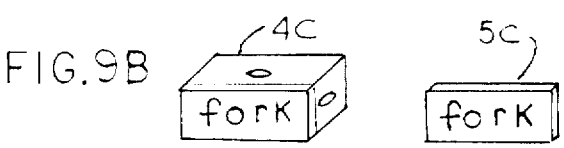

EDUCATIONAL DEVICE TO TEACH THE SEVERELY MENTALLY HANDICAPPED

This is a continuation of application Ser. No. 657,283, filed Jun. 4, 1996.

FIELD OF INVENTION

Educational devices to teach the fundamentals of reading, mathematics and science. This device is specifically developed to teach those with severe mental and physical disabilities.

PRIOR ART

A search of the prior art revealed no patent which could be used to achieve the objects of my invention, even with major modifications.

Educational devices to meet the special needs of the severely mentally retarded were almost none existent. This result can be explained by the following reasons:

1. Extremely Low Mental Level

With an IQ about 33, there are severe mental deficiencies in perception, matching and discriminating skills, as well as language development.

2. Severe Physical Defects

Usually the severely mentally disabled person also has severe handicaps in finger manipulation, arm movement and other physical skills.

3. Recent Mandatory Requirements for Education

Curriculum for teaching appeared in the 1980's after the Federal Law of 1975.

A detailed discussion of U.S. Pat. No. 3,822,487 will be given to substantiate the above remarks.

PRIOR ART

There is one U.S. Pat. No. 3,822,487—Alphabet Block display and Toy' which I would like to discuss in detail. On the surface, this patent appears to have similarities to my patent since blocks are joined together to form words. However, there are many major crucial differences. Actually, if this device were to be used with the severely mentally retarded it would be completely unsuccessful and would result in inner frustration and a strong resistance to future learning attempts.

Claim 1 of the patent states, "A set of three dimensional blocks, each of said blocks being shaped in the form of an alphabet letter, number or other symbol". The enclosed copy of the patent shows a figure where the blocks 11, 12, and 13 are joined to form the word "bat".

In my patent, the letters and words that are formed are to look exactly as they would be found on a printed page. Reading consists in giving meanings to these symbols as they are seen.

However, in the patent being considered, a three dimensional block shaped as a letter or number is used. The block 11, in the figure does not look like the printed letter "b". The blocks 11, 12 and 13 are not seen as "bat". To the severely retarded student this would be extremely confusing since their perceptual and mental abilities are very low. This frustration would cause a strong resistance to any attempts to continue in learning how to read and might very easily be generalized to other learning experiences.

2. Elongated Connecting Members

To use these connecting members, as described in the patent, would also seriously interfere with learning how words are formed from letters. The blocks 11, 12 and 13, are widely separated from each other. They do not appear as a unit and as the word "bat". In my educational device, the ends of the blocks that form words are made to touch each other so that the joining mechanism is not visible. The letters are seen as a group to form the word "bat". When the student has learned to read the word "bat", it could then be placed on one face of the block rather than having three separate blocks. If we were to use his method of uniting blocks, the words would look like this ⓒ-ⓐ-ⓣ, rather than ⓒⓐⓣ.

3. Directionality

In reading a word, we begin looking at the beginning letter and then move to the right. In a sentence, we also read from left to right in the English language. Because of the low mental skills of the severely mentally retarded person, this process must be taught by repeated experiences where the student is always guided to read from left to right. It is not possible to teach this process with the blocks used in this patent. In my device, the four elements are united in a unique manner so that the student has no other choice than go from left to right in forming letters and sentences. The special supporting base holds a vertical member or rod, on the extreme left side and all blocks are joined from the left to the right. In other languages, the vertical rod and beginning block would be at the extreme right.

4. Sorting Process

It is possible in my device to teach visual discrimination through the sorting of different shapes, letters, pictures and words.

5. Placement and Number of Recesses

If we examine blocks 11, 12 and 13 of the patent, we notice that there is a recess in the face of each letter. The severely retarded student could very easily assume that the recess is a part of the letter and become confused when the printed letters do no show this recess.

There are at least four recesses on each block. In trying to connect members, the student would easily become frustrated and lose interest in learning how to read.

6. Finger Manipulative Skills are too High

In order to unite these blocks, the student would have to hold one block and then force the connecting member into the proper recess with the other hand. Many severely retarded students do not have that degree of finger or hand control. The unique arrangements of the four elements in my device make it possible to unite the blocks with only the ability to grasp a block and push a peg into an aperture. The first block is always held rigidly by a vertical member fixed into the supporting base.

The patent under consideration may serve some purposes, but would be unsuccessful and harmful if used with the severely mentally retarded. The very special needs of this type of student in the perceptual, mental and physical skills areas would have to be met.

SUMMARY

This special education device, to teach the severely mentally retarded the basic skills of reading, was developed to meet the specific needs unique to this population. By uniting the four elements, blocks, joining mechanisms, a base and a connecting member, a variety of strucures are built. These structurs include the following:

1. Sorting structures where symbols and pictorial representations are sorted in vertical columns in order to learn reading readiness skills.

2. Words and sentences are formed only in a left to right horizontal direction. The rows of words and sentences formed are parallel to each other and to the flat top surface of the base in order to simulate the same configuration as found on a page to be read.

3. To understand the meaning of a word by structurally associating the word and sentence with the pictorial representation of this word or sentence.

4. To learn how to form new words by changing the beginning or ending consonant of a root phonogram, suitable structures are built.

5. To further relate abstract letters of a word to the real world, a word which is formed can be removed as a unit from the structure and placed next to a real object. The word, "cup" is placed next to a real cup. Since the severely mentally retarded student may not be able to join two blocks by holding one in each hand, the connecting member attached to the base holds the first block of the word rigidly. The other blocks can be added with only a limited use of one arm.

It is an object of this invention to make these elements capable of being manipulated by a severely mentally retarded student who has severe handicaps in finger dexterity and arm movement. It is also an object to provide immediate success by reducing decision-making.

BRIEF DESCRIPTION OF THE DRAWINGS

FIG. 6—A structure which shows how words or group of words are formed similarly to that found on a page to be read in the English language.

FIGS. 6A, 6B and 6C show how the four elements of the invention are assembled to form one row of words found in FIG. 6.

FIG. 7—A structure showing how letters, or drawings or other symbols are sorted in vertical columns.

FIG. 8—A structure which shows how words are associated with pictorial representations of these words.

FIG. 9—A structure showing how words are sorted vertically.

FIG. 9A—Shows how the word cup is formed by uniting the letters, c, u and p.

FIG. 9B—Shows how a veneer, with a word on its surface, is attached to a block in order to sort words.

DETAILED DESCRIPTION

I—Elements of the Educational Device

This educational device comprises four elements which are assembled and disassembled in order to form words, sentences and other structures that are used in teaching basic reading skills to the severely mentally retarded. These elements comprise the following:

A. Blocks, with at least one of its faces, having symbols or pictorial representations. Also, on each of these blocks, a face that has a means of joining other blocks to form words and sentences, only in a row which is horizontal and going from left to right. There is also a face on each of these blocks which has a means of connecting to a connecting member.

B. The connecting member has a number of different functions. It holds the first block vertically in a rigid position; separate the rows of words and sentences that are formed so they are parallel to each other and to the top flat surface of the base; and to form other structures as shown in FIGS. 2, 5, 6, 7 and 8.

C. Joining mechanisms which join the blocks only in a horizontal left to right direction to form words and sentences.

D. A base which provides support and stability to all the structures which are built. In addition, it has a means by which a vertical connecting member can be attached and removed from the left side of its flat horizontal surface.

These elements and their interrelationships were developed in order to meet the unique needs of the severely mentally retarded in the area of basic reading skills. These needs include extremely low mental level; severe physical disabilities; little or no skill in writing or speech; and extreme difficulty to unlearn mistakes.

As I describe each element, I will show how these specific problems have been considered and overcome by the special characteristics of the element and its relationship to the other elements.

A. Blocks and Low Mental Level

If we assume the severely retarded student has an intelligent quotient (IQ) of about 33, a student who is 12 years old would have a mental age of about 4 years. However, there would be some major and crucial differences when compared to a 4 year old in a pre-school group. In one year, we would normally expect the 4 year old to develop mental and physical skills of a five year old. With the severely mentally retarded 12 year old, there would be no way to determine the progress, if any, after one year. Any positive changes would depend upon the severity of the mental handicaps and the physical disabilities.

In reading, these mental handicaps would be seen in at least three significant areas-directionality; word formation; and associating the written word to the actual object. I would like to consider each skill separately and show how the blocks of this device help in teaching these areas.

1. Blocks and Directionality

Figure 1:
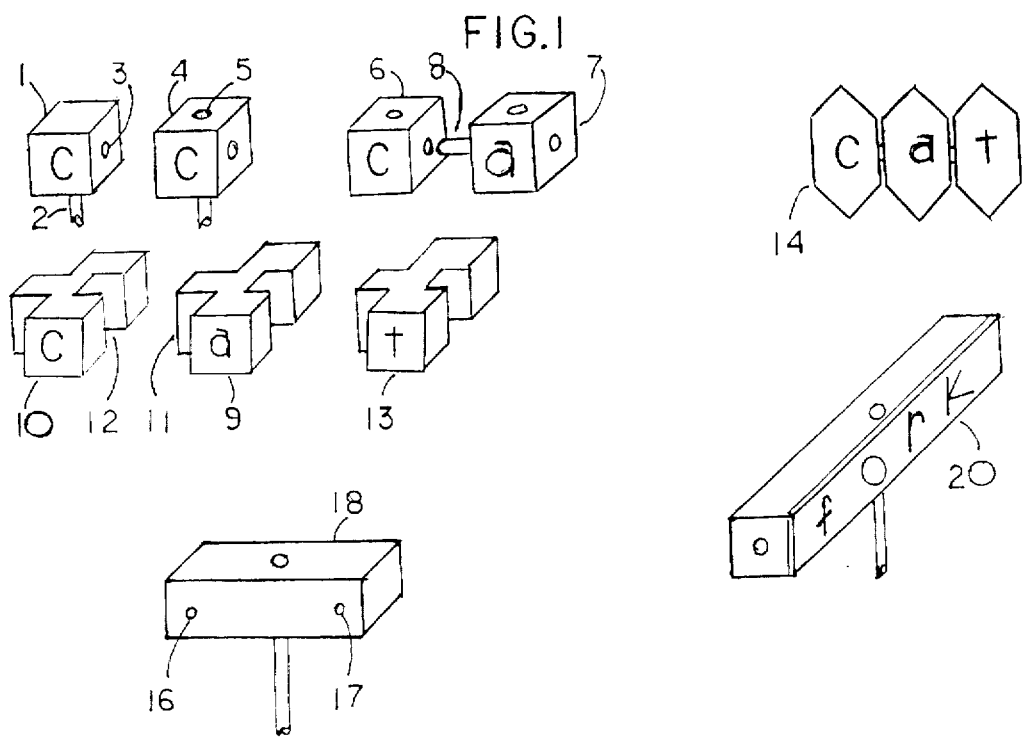
FIG. 1—A sample of the types of blocks which are used to form words and sentences. Each block has a means of joining and a means of connecting to the supporting base.

In the English language, words and sentences are read from left to right. A severely retarded student has difficulty in knowing the difference from left and right and where to start in reading. By examining FIGS. 5 and 5A we see how blocks of this educational device will automatically and easily teach the student to read and form words in a left to right direction. Rod 81, FIG. 5 inserted at the extreme left end of base 82, holds block 71. Block 73 with peg 72 on the left side can only be joined to block 71 on the right side. Block 74 with the letter "a" must also be joined on the right side. When block 75 is rotated, the word "cat" is formed in the proper direction. In FIG. 1, block 1 similarly has an aperture (3) on the right side of the block so that any block joined to it, must go from left to right.

The student has no choice to make, and by repeating this process, will be continuously reinforced to read in the left to right direction. In FIGS. 6, 6A, 6B and 6C, we see how sentences are formed in the same manner.

2. Blocks and Formation of Words

Words are formed by grouping letters in a certain order and seeing these as a unit rather than separate letters. With these special blocks, a student can take each letter and join them together to form a unit. The student actually experiences and sees the word being formed. The word "cup" can be picked up as a unit and placed next to a real cup.

3. Blocks and Association of Words with Real Objects and Actions

A student may be able to read a word and even say it, but this does not indicate that the student can associate the word with the real object or action. In FIG. 8 we see how these blocks can be used to show this relationship. In the lower horizontal line, we have a block with the picture of a cup. On the right of block 3d we have the word "cup" formed. On the horizontal line above cup, there is a block with the picture of a fork and the corresponding word, "fork". By repeatedly building structures of this kind, the student is actually learning the meaning of the symbols which form the word.

An action word such as "jumping" or "running" can be taught by relating a picture of the action on a block with the blocks which spell out the word.

B. Blocks and Severe Physical Handicaps

1. Finger Manipulation and Wrist Movement

Figure 5:
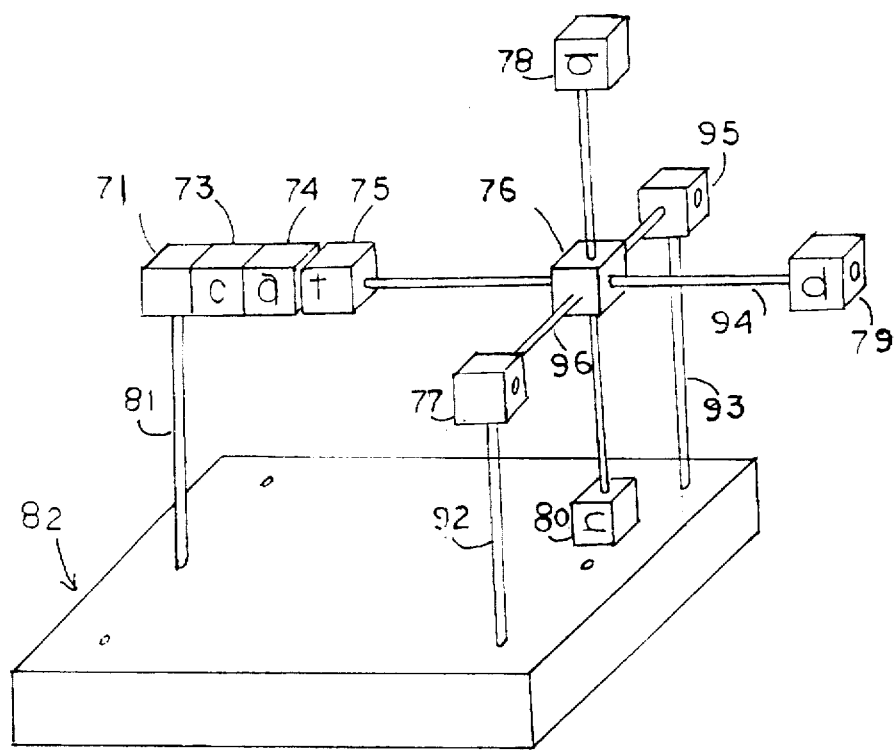
FIG. 5—Wheel-like structure that shows how different words are formed by changing the final consonant.

When someone usually joins two blocks, one of the blocks is held in one hand while the second block is pushed by the other hand. The severely retarded person is usually unable to perform this task because of the poor finger manipulation and limited use of one or both arms and wrists. However, in this educational device, the first block on the left side is held rigidly by a rod which is inserted into the supporting base. Examples of how this is done will be found in FIG. 2 block 23 by rod 22; FIG. 5, block 71 by rod 81; and in FIG. 6 block 1a by rod 9a. In each situation, the first block is held stationary so that other blocks can be connected with the use of only one hand and with only the ability to grasp a block.

2. Limited Arm Movement

If ordinary blocks, without joining mechanisms, were used and no apertures in the blocks, attempts to place these blocks together would not be possible unless there was high control of arm movement. Blocks would move and the severely retarded student, with very poor control, would be unsuccessful in forming a word. With the first block fixed and an aperture on the right side, the student could easily connect the blocks.

C. Blocks and Inability to Write or Speak Effectively

The severely retarded student usually is unable to write due to very poor finger manipulation. The ability to express thoughts and feelings verbally is also very limited. In a regular classroom, the student is given written or verbal tests to determine specific weaknesses in reading skills. Exercises are given in printing words or in reading out loud. Visual discrimination skills and reading readiness skills are developed in this manner.

By the use of sorting techniques, it is possible to teach these skills to the severely mentally retarded student. In FIG. 1, block 4 has an aperture 5 to which a vertical rod can be inserted. FIGS. 7 and 9, show how pictures, letters and words can be sorted in vertical direction in order to teach visual discrimination. Boredom is considerably reduced as the student repeats the process since the student finds satisfaction in building and seeing the structures that are produced.

D. Blocks and Unlearning Mistakes

If a student in a regular classroom makes mistakes that are not noticed immediately, the instructor can usually correct these errors over a relatively short period of time. Because of the low level of intelligence and other disabilities, the severely retarded student may not be able to remedy these mistakes even over long periods of time. The resulting confusion, failures and frustration will develop an unexpressed internal resistance to learning how to read. This resistance may become generalized to other forms of education.

In this educational device, the instructor is able to see immediately when the student is making a mistake. As a result of this feedback, the error is detected quickly and the instructor can give the student appropriate tasks to correct the mistake.

E. Other Modifications of Blocks

1. Blocks and Symbols

A fundamental characteristic of this invention is that each block must have at least one face with a symbol. This symbol may be permanently affixed to the surface either embedded or raised. Symbols may also be attached and removed in a number of ways. In FIG. 1, block 1 and in FIG. 4 block 41 the letter "c" is a part of the block itself. However, in FIG. 4, various methods of attaching and removing symbols are shown. The face of block 42 is shaped so that the symbol 43 can slide into the slot. The block 44 has a veneer such as velcro, 45 to which the symbol 46 can adhere.

Figure 4:
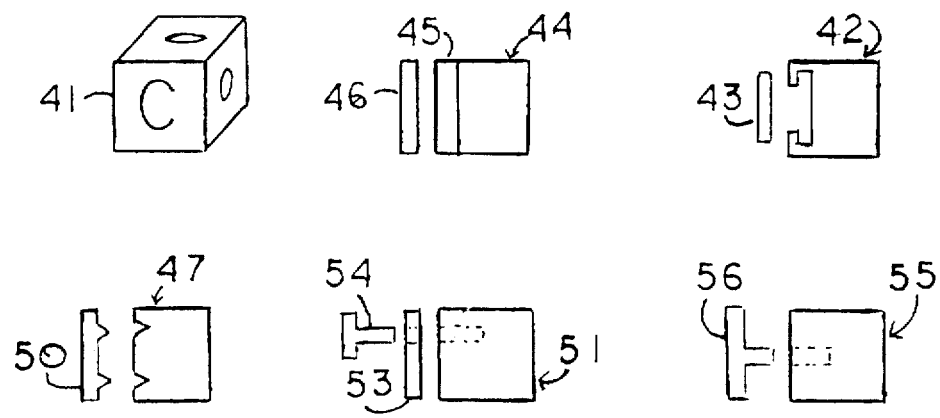
FIG. 4—Symbols are permanently embedded, raised, attached by sliding into the face of the block or other means.
Figure 4:
Figure 4:
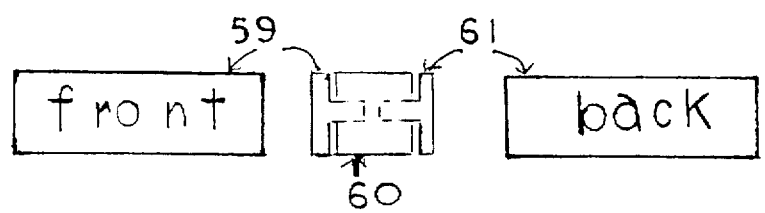

In the same FIG. 4, block 47 has two apertures which accomodates the two protrusions of symbol 50. Block 51 has an aperture which allows the symbol 53 to be attached to the surface by a bolt or peg 54. Block 55 has an aperture in the center of the block so that the protrusion on symbol 56 can easily be inserted and removed.

These variations of attaching symbols to blocks reduces the cost of the device greatly. For example, if the student is to sort 10 letter "a" blocks from 10 letter "b" blocks and to also sort the letter "s" from "c", 40 blocks would be needed if the letters were embedded into the surface permanently. However, if block 55 of FIG. 4 were used, a large number of symbols could inexpensively be reproduced similar to 56. This type of symbol could also be used to form a number of words where the letter "a" or the other letters are used.

In the beginning, a severely retarded student might easily confuse blocks with the letter "c" with blocks having a letter "u", when grouped together on a table top. In order to help the student to recognize the top of the letter and see it as it is printed, the type of blocks found in FIG. 4, can be used. The faces of the blocks 57 and 58 have been modified so that the student would be able to recognize the top and proper position of the letter. Block 57 has some type of border on the top and the corners of block 58 have been cut.

Another asset of this type of block is pictured in FIG. 4, block 60 and the veneer symbols 59 and 61. In sorting words or assembling sentences, the total word could be placed on a face of the block. In addition, the meaning of the words "front" vs. "back" could be visualized and understood.

In FIG. 1, other modifications of blocks are shown. Block 14 has a six-sided cross-section, with a symbol on one face and a means of joining the blocks.

Block 18 of FIG. 1, has two apertures on the surface, 16 and 17 and is longer, so that words can be attached and removed. Block 20 shows how this is accomplished with the word, "fork".

In FIG. 1, blocks 10, 9, and 13 are blocks that are slotted so that the blocks may be joined in a vertical direction. The protrusion 11 of block 9 is slid into the channel or slot, 12, of block 10. Some retarded students may find it easier to join blocks in a vertical direction, going downward, because of specific restrictions in arm movement.

B. Supporting Base

The supporting base performs two major functions namely, a means of providing support and stability to the structures which are built and a means of accomodating the first vertical joining mechanism in a fixed position and at the beginning of the formation of a word which is going in the direction of the reading language of the specific culture.

1. Holding Vertical Rod in a Fixed Position

The supporting base must be able to hold a vertical rod or similar mechanism, so that the first block will be rigidly held and other blocks can be joined to it in a direction used by the culture to form words and sentences. In the English language, this vertical rod would be at the extreme left side of the base so that other blocks can be joined in the left to right direction.

This special function of the base is crucial with the severely mentally retarded student be cause the student is usually unable to hold blocks in each hand and join them. In addition, reading from left to right must be taught repeatedly and made automatic, since the mental level is extremely low.

Figure 2:
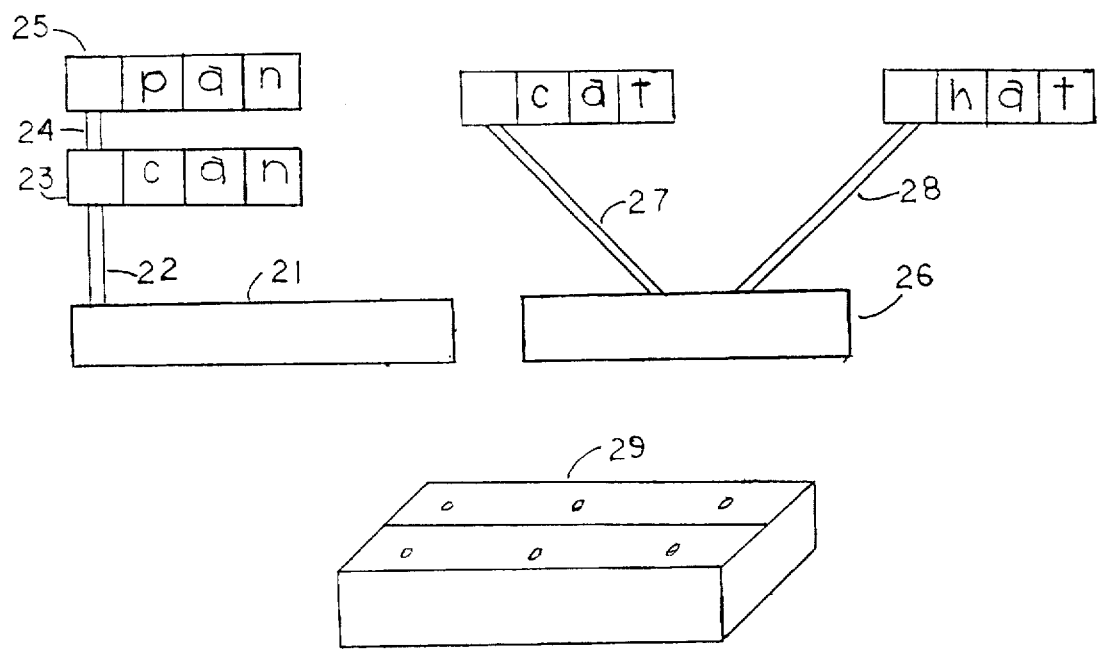
FIG. 2—Supporting bases are represented showing how the connecting member is connected on the left end of the flat top surface.

In FIG. 2 the base 21 supports rod 22 and block 23 so that blocks with letters c, a and n can be joined to form the word "can" in a left to right direction. Since the block is fixed and is at the beginning of the word, the student need only have the ability to use one hand in order to form the word properly. Rod 24 and block 25 are also supported.

Base 26 of FIG. 2 can hold rods 27 and 28 so that words can be formed easily and correctly yet they are not perpendicular to the surface of the base. Beginning blocks are held rigidly and the correct directionality is maintained.

A special type of supporting base, FIG. 2, base 29 is box-like in shape and has a number of apertures on the top surface.

Another unique aspect of this base is that the top surface consists of two separate panels. Either panel can be removed and replaced with a panel which has a different number of apertures, spaced differently and with various cross-sections. With additional features, learning experiences can be provided to meet the individual mental and physical needs of the student.

2. Stability and Support

Since the base must support all the structures that are formed—fixed or moving—it is essential that the base have sufficient strength and shape to sustain these forces and weights. FIG. 2, bases 21, 26 and 29 are examples. In addition to box-like formations, the supporting base in FIG. 6 provides stability in another manner. Rods fit into the side apertures 10a and 11a, and is balanced by placing blocks on each end.

3. Other Variations of Supporting Base

Supporting bases may be solid or hollow depending upon the type and complexity of the structures which are being built. For example, base 26 of FIG. 2 could be hollow and the space underneath used for additional purposes such as storage of blocks and pegs.

Bases can be united to each other to form meaningful structures in more complex and dynamic presentations to understand words used in reading.

C. Joining Mechanisms

Figure 3:
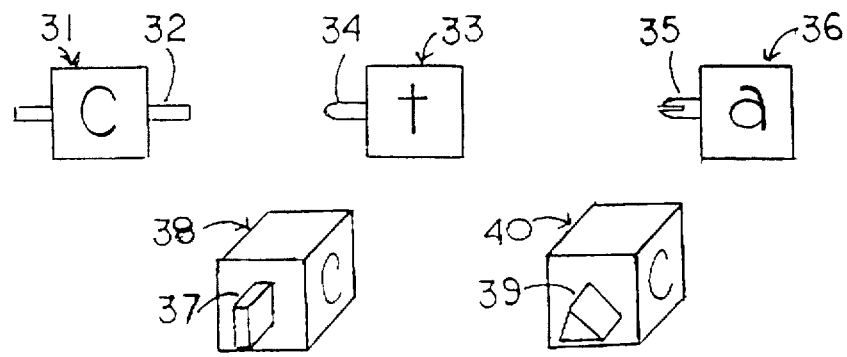
FIG. 3—The means of joining the blocks to form words and group of words using pegs as joining mechanisms. The cross-sections of the pegs are at least circular, rectangular or triangular.

The joining mechanisms which join blocks to form words and sentences are sized and configured so that the blocks join only in a horizontal left to right direction. In FIG. 3, pegs are used as shown on blocks 31, 33, and 36. So that letters will be joined always in the correct position, rectangular and triangular cross-section pegs are used (blocks 38 and 40).

D. Connecting Member

This special part of the structure performs a number of different functions.

1. It holds the first block in a fixed position so that other blocks can be joined easily in the formation of words. Since the severely mentally retarded student probably can not hold a block in each hand in order to join them, having the block held rigidly makes it possible to form words with only one hand.

2. Connects the structures formed to the supporting base.

3. Separates each row of words or sentences formed from each other so that they have the appearance of sentences found on a page to be read.

4. They make it possible to sort symbols, words and pictorial representations in vertical columns. This is important is developing reading readiness skills.

5. Connects a block with the pictorial represention to the word which represents it. Letter and words are abstract symbols and the severely mentally retarded student must learn, by constant repetition that they represent real objects and actions. In FIG. 8 using the connecting member, the words "cup" and "fork" are associated with a drawing of a cup and fork. Similarly a picture of someone eating could be placed on the left side and the word "eat" on the right side of the connecting member.

II—Using the Educational Device for the Teaching of Reading

The usual sequence in teaching basic reading skills include the following:

A. Reading-readiness skills
B. Formation of Words from letters
C. Associating the meaning of a word to the written word
D. Forming phrases and sentences A. Reading-Readiness Skills Before words can be recognized as a unit, it is necessary for the student to develop the skill of discriminating between letters and symbols. Usually, the instructor can supplement visual tasks with the printing of letters. However, the severely mentally retarded student usually has severe deficits in finger manipulation and this additional method may not be possible.

In a regular classroom, mistakes or lack of understanding on the part of the student, can be determined through written or verbal tests. Again, this is not possible for the severely mentally retarded student.

My special educational device overcomes these obstacles by providing the student with various sorting exercises. The instructor receives immediate visible feedback when an error is made and also can detect the weaknesses in the student's mental processes. Appropriate tasks can be given which will correct these handicaps before they become deeply ingrained in the student's mind.

1. Sorting of Symbols, Letters and Numbers

In FIG. 7, the four elements of the invention are used for sorting purposes. The base, 9b, has two apertures on the top surface. Vertical rods, 3b and 4b with the blocks 5b and 6b, respectively, are inserted into the base by the instructor. Blocks 1b and 2b are placed on the base so that each block which is sorted can be matched.

All the blocks to be sorted are placed on the table surface. Each of the blocks has a connecting rod protruding from the bottom surface of the block. The student picks up a block, matches the letter with either block 1b or 2b and then pushes the rod into the appropriate block on the vertical column. This process continues until all the blocks have been sorted. The arrows shown in the drawing indicate that more than ten blocks can be sorted.

If an error is made, the instructor can see it immediately. After all the blocks are sorted, the instructor can record the percentage which are correct. Specific tasks can be then assigned to the student in order to improve the scores.

In addition to letters—numbers, symbols or pictorial representations of objects can be sorted.

2. Sorting of Words

In FIG. 9, words are sorted in the same manner. FIG. 9A shows how a word for sorting can be formed by joining the blocks 1c, 2c, and 3c.

Another way of forming words to be sorted is found in FIG. 9B. A veneer with the word "fork" is attached to the block 4c and then used for sorting purposes.

B. Formation of Words from Letters

Figure 5A:
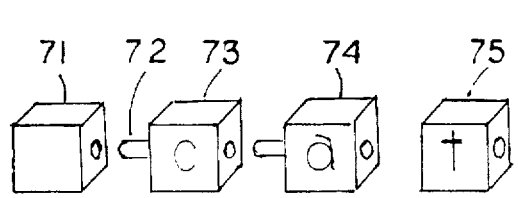
FIGS. 5A and 5B—Enlargements of specific parts of FIG. 5
Figure 5B:
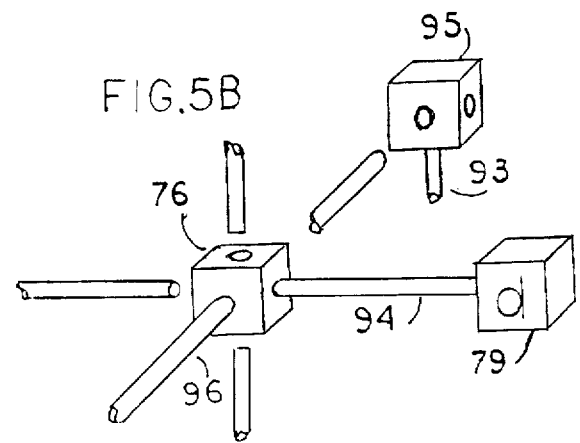

One way to show a student how words are formed is to add consonants to a root sound. For example, by adding the consonants t or p to the initial sounds ca- or cu-, the words cat, cap, cut and cup are formed. FIGS. 5, 5A and 5B show how this educational device can be used to form words in this manner. In FIG. 5, the "ca" is formed in the usual manner starting with rod 81 on the left side of base 82. FIG. 5A is an enlargement of this section, showing how blocks 73 and 74 are joined to block 71 by means of pegs such as 72. The wheel system of the structure in FIG. 5, is built by first inserting rod 92 into the base 82. After block 77 is firmly fixed on top of rod 92, a rod 96 is inserted into block 77. FIG. 5B is an enlargement of this section. Block 76 slides onto rod 96 and the end is pushed into block 95. After radial rods are pushed into block 96, blocks 75, 78, 79, and 80 are added.

C. Associating the Meaning of a Word to the Written Word

After reading readiness skills have been taught, the student is capable of associating a written word with a specific meaning. The student may be able to visually discriminate between the letters c, p and u, but does not know that the arrangement "cup" represents the drinking utensil we call "cup". In a regular classroom, the student can be given a series of written and verbal tests, to measure the understanding of the student. However, with the severely mentally retarded student, this is not usually possible. Special methods and techniques are necessary.

In FIG. 8, the elements of this educational device are combined in a unique manner so that the pictures of objects are associated with the written word representing this object. The vertical rod, 6d, is pushed into an aperture on the left side of base 8d. Since the rod is now firmly fixed, the student with the use of only one arm can push the block 3d onto the end of this rod. The block, with the picture of a cup, block 1d can be attached by the instructor, if the student is unable to accomplish the task at this time. The student can now join the letters c, u, and p, to form the word, "cup". The vertical rod, 7d, can now be inserted into the top aperture in block 3d. The same procedure is used to attach the picture and word for "fork".

D. Phrases and Sentences

In FIG. 6, the same four elements are specially united so that sentences can be built. The student begins by inserting rod 9a in the extreme left aperture of the base 8a. The formation of the sentence, "cat sat on bat" is shown in greater detail in the FIGS. 6A, 6B and 6C.

Block 2a of FIG. 6A has a peg 7a which protrudes a specific distance on each side. In FIG. 6B, the word "cat" is formed when blocks 1a, 2a, 3a, 4a, 5a, of FIG. 6A are joined. Rod 6a in FIGS. 6 and 6C now supports block 5a so that the word "sat" may be formed. Additional vertical rods are used to complete the sentence and to form the additional sentence, "bat is in hat", on the horizontal row aboce it. The structure shown in FIG. 6 is complex and would be attempted only after simpler tasks have been completed.

Ramifications, Scope and Additional Uses of the Invention

Although this educational device was specifically developed for the severely mentally retarded, there are many other groups in the population who would greatly benefit from the use of this device. An examination of this device will reveal many more uses than the four I will describe.

1. Headstart Program in United States and other Pre-School Programs

Millions of Headstart children who come from socially and economically deprived areas, are given special programs before they enter kindergarten and first grade. Reading-readiness activities, particularly in visual discrimination, are provided so that they will be better prepared to learn reading skills in first and second grades. This educational device would be of great benefit to the millions of children enrolled in this program.

They could sort shapes, numbers letters, and eventually words in an interesting and self-motivating set of activities. Directionality, reading from left to right, would automatically be taught as they began to use the four elements of this device.

The instructor would have more time to devote to students who had greater needs as other students were working individually with this device.

The same advantages would also apply to the millions of children who are attending nursery and kindergarten classes.

2. International Use of this Educational Device

Each individual element of this device and their interrelationships, has made it possible to be used in other languages. In the English language, words are read from left to right and from the top of the page to the bottom. In other languages, such as Hebrew, words are read from right to left.

Using this special supporting base, the first vertical peg and block could be placed at the extreme right end. Blocks could then be joined in a right to left direction. If a culture wrote its words in a vertical direction, these same four elements could be used to teach basic reading skills in that language as well.

3. Reading Musical Notes and Words of a Song

Using the four elements of this device, it is possible to teach the student to read songs while learning to read the musical notes which correspond to each syllable of the words. For example, if one were to teach the song and music to "Old Mac Donad Had a Farm", the words could be built in a manner similar to those in FIG. 6. Above the word, "old", a block with letter "f" could be attached so that the appropriate pitch would be associated with the word. The symbol for a half-note would also help to indicate how long the sound would be held.

4. Specific Reading Disabilties for Non-retarded Persons

There are a number of children whose IQ is 100 or more who have specific handicaps in perception which interfere with learning how to read. Those who have dyslexia or tend to reverse the symbols they read, could benefit from the use of this educational device.

What I claim is:

1. A special education kit used in the teaching of basic reading skills to the severely mentally retarded, the kit comprising:

a plurality of blocks, a plurality of joining members, a plurality of connecting members and at least one base member;

said plurality of blocks each having a plurality of faces, including a joining face on each of said blocks having a joining aperture sized and configured to receive one of said joining members, and a connecting face having a connecting aperture sized and configured to receive one of said connecting members two types of blocks, a first type of block having a letter on only one of its faces, and a second type of block having a pictorial representation associated with a word or group of words on only one of its faces;

said plurality of joining members each defined by a peg which is sized and configured to be inserted into and releasably held in the joining apertures on the joining faces of the blocks;

said plurality of connecting members each defined by a rod which is sized and configured to be inserted into and releasably held in the connecting apertures on the connecting faces of the blocks;

said joining members and said connecting members having differing configurations such that the joining members can only be inserted into and releasably held in the joining apertures and the connecting members can only be inserted into and releasably held in the connecting apertures;

said at least one base member dimensioned and arranged to support and stabilize a plurality of blocks, joining members and connecting members when assembled, said base member having a flat top surface with a connecting aperture on one end thereof, sized and configured to receive and releasably hold one of said connecting members therein;

said plurality of blocks configured to be joined by said joining members only in a horizontal direction; and said kit adapted to be assembled such that said first type of blocks having letters are joined to form words or groups of words, and said second type of blocks have pictorial representations which are associated with the word or group of words formed by the first type of blocks; and wherein the assembly includes the connecting members connecting the word or group of words formed by the first type of blocks and said pictorial representations of the second type of blocks in a spaced relationship.

* * * * *